(12) United States Patent
Katsuda et al.

(10) Patent No.: US 11,477,335 B2
(45) Date of Patent: Oct. 18, 2022

(54) IMAGE FORMING APPARATUS AND RESPONSE NOTIFICATION METHOD

(71) Applicant: Konica Minolta, Inc., Tokyo (JP)

(72) Inventors: Takeo Katsuda, Tokyo (JP); Yusuke Mikoshiba, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/350,459

(22) Filed: Jun. 17, 2021

(65) Prior Publication Data

US 2021/0409562 A1 Dec. 30, 2021

(30) Foreign Application Priority Data

Jun. 29, 2020 (JP) .............................. JP2020-111551

(51) Int. Cl.
*H04N 1/00* (2006.01)

(52) U.S. Cl.
CPC ....... *H04N 1/00477* (2013.01); *H04N 1/0048* (2013.01); *H04N 1/00244* (2013.01); *H04N 1/00403* (2013.01); *H04N 2201/0094* (2013.01)

(58) Field of Classification Search
CPC ....... H04N 1/00477; H04N 2201/0094; H04N 2201/0036; H04N 1/00244; H04N 1/00403; H04N 1/0048; H04N 1/32534; G06F 3/1203; G06F 3/1237; G06F 3/1279; G06F 3/167

USPC ........................................................ 358/1.15
See application file for complete search history.

(56) References Cited

U.S. PATENT DOCUMENTS

| 9,111,209 B2 * | 8/2015 | Utah ................. G03G 15/5004 |
| 2014/0355058 A1 | 12/2014 | Matsuhara et al. |
| 2020/0195803 A1 | 6/2020 | Kobayashi |

FOREIGN PATENT DOCUMENTS

| EP | 1777675 A1 | 4/2007 |
| JP | 2006-023636 A | 1/2006 |
| JP | 2008026945 A | 2/2008 |
| JP | 2008158808 A | 7/2008 |

OTHER PUBLICATIONS

Extended European Search Report issued in corresponding European Patent Application No. EP 21172256.6 dated Oct. 18, 2021 (7 pages).

* cited by examiner

*Primary Examiner* — Neil R McLean
(74) *Attorney, Agent, or Firm* — Osha Bergman Watanabe & Burton LLP

(57) ABSTRACT

An image forming apparatus includes: a hardware processor that: executes processing corresponding to an instruction input via an external device; sends a first notification to the external device according to a completion of execution of the processing; and upon estimating that the execution of the processing is not completed before a timeout time, sends a second notification different from the first notification to the external device. The external device sets the timeout time for the first notification.

11 Claims, 6 Drawing Sheets

IMAGE FORMING APPARATUS AND RESPONSE NOTIFICATION METHOD

CROSS-REFERENCE TO RELATED APPLICATIONS

The entire disclosure of Japanese patent Application No. 2020-111551, filed on Jun. 29, 2020, is incorporated herein by reference in its entirety.

BACKGROUND

Technical Field

The present invention relates to an image forming apparatus, a response notification method, and a recording medium storing response notification instructions.

Description of the Related Art

An image forming apparatus such as a multi-function peripheral (MFP) is known that can operate multiple functions such as copying, scanning, printing, and faxing by a voice instruction input by a user (see JP 2006-023636 A).

In addition, many types of smart speakers are currently in practical use. The smart speaker can acquire a voice of a user, output, as voice, a response corresponding to the acquired voice, and instruct an external device or the like via a cloud server to perform an operation corresponding to the acquired voice.

When the above-described image forming apparatus and smart speaker are connected, it is possible to transmit the voice instruction of the user to the image forming apparatus via the cloud server and operate the image forming apparatus by voice.

Incidentally, it may be specified that the cloud server times out if there is no response from the image forming apparatus to the cloud server for a certain period of time (for example, five to seven seconds) after the voice instruction of the user is transmitted to the image forming apparatus for a response operation of the image forming apparatus.

In the case of such specifications, when the voice instruction of the user is transmitted to the image forming apparatus, the cloud server times out if it takes time for the image forming apparatus to process the voice instruction and the image forming apparatus cannot respond to the cloud server within the certain period of time.

For example, when a setting for image formation (for example, sheet selection) is input to the image forming apparatus, input processing is performed on an operation screen whether the user performs an input operation directly from the operation screen or the user performs the input operation by voice from the smart speaker. Therefore, when the input is performed by voice from the smart speaker, the response from the image forming apparatus to the cloud server is delayed until the input processing of the setting on the operation screen is completed. In particular, if an error (such as selecting a sheet that cannot be selected) occurs or prohibition processing (confirmation of whether an input value is a value that cannot be selected) is required due to the input setting, the processing time is longer, and thus the response from the image forming apparatus to the cloud server is delayed.

As described above, when the image forming apparatus is operated by voice from the smart speaker, the cloud server may time out depending on the contents of the setting input by the voice operation. In such a case, for example, due to the timeout of the cloud server, the voice operation may be interrupted and a subsequent voice operation may not be continued. Furthermore, for example, due to the timeout of the cloud server, the operation may have to be restarted from the beginning, and operability of the voice operation may deteriorate.

SUMMARY

One or more embodiments of the present invention provide an image forming apparatus, a response notification method, and a recording medium storing response notification instructions that can avoid a timeout of an external device when the image forming apparatus is operated by voice from the external device.

According to one or more embodiments of the present invention, an image forming apparatus comprises a hardware processor that: executes processing according to an instruction input via an external device; sends, to the external device, a first notification according to a completion of the execution of the processing; and sends, to the external device, a second notification different from the first notification when it is estimated that the execution of the processing is not completed before a timeout time set in the external device for the first notification.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, embodiments of the present invention will be described with reference to the drawings. However, the scope of the invention is not limited to the disclosed embodiments.

Figure 1:
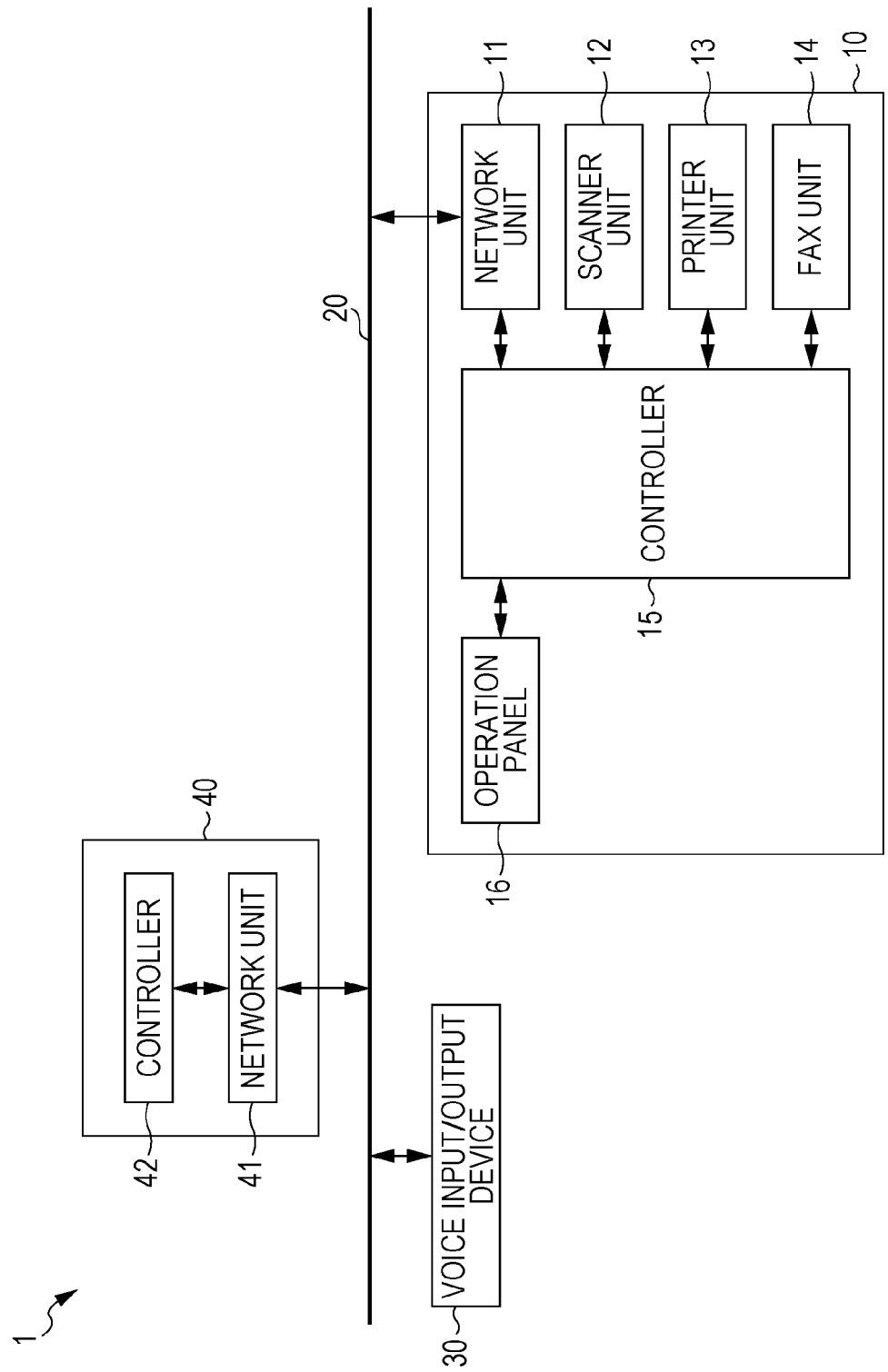
FIG. 1 is a block diagram for describing a schematic configuration of an image forming system according to one or more embodiments of the present invention.

FIG. 1 is a block diagram for describing a schematic configuration of an image forming system 1 of one or more embodiments. The image forming system 1 includes an image forming apparatus 10, a network 20, a voice input/output device 30, and a server 40. The image forming apparatus 10 is connected to the voice input/output device 30 and the server 40 via the network 20.

The image forming apparatus 10 is an MFP having multiple processing functions such as copying, scanning, printing, and faxing, and includes a network unit 11, a scanner unit 12, a printer unit 13, and a fax unit 14.

The network unit 11 performs communication processing for transmitting and receiving various types of information to and from the voice input/output device 30 and the server 40 via the network 20 such as a local area network (LAN) or a telephone line. The network 20 is not limited to the LAN or the telephone line, but may be a wide area network (WAN) or the like, and may be wireless or wired.

The scanner unit 12 optically reads a document and creates image data to perform scan processing on an image. The scanner unit 12 may include an automatic document feeding device called an auto document feeder (ADF). In this case, when a user sets a large number of documents in a document tray of the ADF, the documents are automatically transported one by one, and the scan processing can be continuously performed on images of the documents at once.

The printer unit 13 prints an image on a sheet material such as printing paper based on the image data read by the scanner unit 12 or image data for printing from an external device, to perform printing processing on the image. For example, in the case of copying, the scanner unit 12 scans the document, and the printer unit 13 prints the image of the document on the sheet material. As a printing method, any known printing method such as a laser method or an inkjet method can be applied.

The fax unit 14 transmits the image data read by the scanner unit 12 and receives the image data transmitted from the outside via the network 20 such as a telephone line, to perform fax processing on the image.

Furthermore, the image forming apparatus 10 includes a controller 15 (computer), an operation panel 16 (display), and the like.

The controller 15 includes a processor such as a central processing unit (CPU), a memory such as a random access memory (RAM) or a read only memory (ROM), and the like although detailed illustration thereof is omitted. The controller 15 controls the network unit 11, the scanner unit 12, the printer unit 13, and the fax unit 14 described above based on input from the operation panel 16 or input from the voice input/output device 30 and the server 40. The controller 15 also controls the operation panel 16.

The operation panel 16 includes, for example, a display device such as a liquid crystal display (LCD) and an input device having a transparent touch pad, an input button, or the like attached to the front of the display device, although detailed illustration thereof is also omitted. Operation instruction information (command) input to the operation panel 16 by use of the touch pad or the input button is input to the controller 15.

The voice input/output device 30 is a device that inputs and outputs a voice. The voice input/output device 30 includes a microphone, a speaker, a network unit, a controller, and the like, although detailed illustration thereof is also omitted.

When the voice is input from the outside, the microphone outputs the voice as an electric signal to the controller. The speaker outputs an electric signal input from the controller to the outside as voice. The network unit performs communication processing for transmitting and receiving various types of information to and from the image forming apparatus 10 and the server 40 via the network 20. The controller encodes the electric signal of the voice input from the microphone into voice data, and transmits the voice data to the server 40 via the network unit. Furthermore, the controller receives voice data transmitted from the server 40 via the network unit, converts the voice data into an electric signal, and outputs the electric signal to the speaker.

The server 40 includes a processor such as a CPU, a memory such as a RAM or a ROM, and the like although detailed illustration thereof is omitted. The server 40 includes a network unit 41, a controller 42, and the like.

The network unit 41 performs communication processing for transmitting and receiving various types of information to and from the image forming apparatus 10 and the voice input/output device 30 via the network 20.

The controller 42 performs voice recognition processing for converting the voice data transmitted from the voice input/output device 30 into operation instruction information (command). Any known method can be applied to the voice recognition processing in the controller 42. Furthermore, the controller 42 performs processing corresponding to the command obtained by the voice recognition processing, for example, response processing to the voice input/output device 30 or transmission of the command to the image forming apparatus 10. For example, when a voice instructing the image forming apparatus 10 to perform processing is input to the voice input/output device 30, voice data of the voice is converted into a command, and the command is transmitted to the image forming apparatus 10. Such processing in the controller 42 is provided as, for example, an application on the server 40.

The above-described voice input/output device 30 functions as a so-called smart speaker, and the server 40 functions as a cloud server that responds to the voice input from the voice input/output device 30 by the user and gives an instruction to the image forming apparatus 10.

Therefore, when the user inputs an operation instruction by voice (voice instruction) from the voice input/output device 30, the server 40 converts voice data of the voice instruction into a command and transmits the command to the image forming apparatus 10. The image forming apparatus 10 then performs processing corresponding to the command transmitted from the server 40. That is, in the image forming system 1, the image forming apparatus 10 can be operated by a voice operation.

Incidentally, it may be specified that the server 40 times out if there is no response from the image forming apparatus 10 to the server 40 for a certain period of time after transmitting the voice instruction of the user to the image forming apparatus 10 for a response operation of the image forming apparatus 10.

In the case of such specifications, when the voice instruction of the user is transmitted to the image forming apparatus 10, the server 40 times out if it takes time for the image forming apparatus 10 to process the voice instruction and the image forming apparatus 10 cannot respond to the server 40 within the certain period of time.

Therefore, in one or more embodiments, the image forming apparatus 10 includes a processing executor that executes processing according to an instruction (voice instruction) input via an external device, and a first notifier that sends, to the external device, a first notification according to a completion of the execution of the processing. In one or more embodiments, the first notifier sends the first notification after determining that the execution of the processing will be completed. Furthermore, the image forming apparatus 10 includes a second notifier that sends, to the external device, a second notification different from the first notification when it is estimated that the execution of the processing is not completed before a timeout time set in the external device for the first notification.

In one or more embodiments, the external device is the voice input/output device 30 and the server 40. Note that the external device may be the voice input/output device 30 as long as the voice input/output device 30 has the function of the server 40.

The processing executor, the first notifier, and the second notifier are each provided as one function of the controller 15. For example, the processing executor, the first notifier, and the second notifier are provided as instructions executed by the controller 15.

The processing executor executes the processing in the image forming apparatus 10 in response to the voice instruction input via the voice input/output device 30 and the server 40. For example, when a setting for image formation (for example, sheet selection) is input to the image forming apparatus 10 by the voice instruction, the processing executor executes input processing of the setting for image formation on an operation screen of the operation panel 16.

In addition, the first notifier sends, to the voice input/output device 30 and the server 40, the first notification according to the completion of the execution of the processing in the image forming apparatus 10 (first notification processing). For example, as described above, when the processing executor executes the input processing of the setting for image formation and the input processing is completed without an error, the first notification to the effect that "setting is completed" is sent to the voice input/output device 30 and the server 40 in response to the completion of the execution.

In addition, the second notifier estimates whether the processing in the image forming apparatus 10 is completed before the timeout time set in the voice input/output device 30 and the server 40 for the first notification. Furthermore, when it is estimated that the processing in the image forming apparatus 10 is not completed before the timeout time, the second notifier sends the second notification different from the first notification to the voice input/output device 30 and the server 40 (second notification processing). For example, as described above, when the processing executor executes the input processing of the setting for image formation and it is estimated that the input processing is not completed before the timeout time, the second notification to the effect that "setting is impossible" is sent to the voice input/output device 30 and the server 40.

Figure 2:
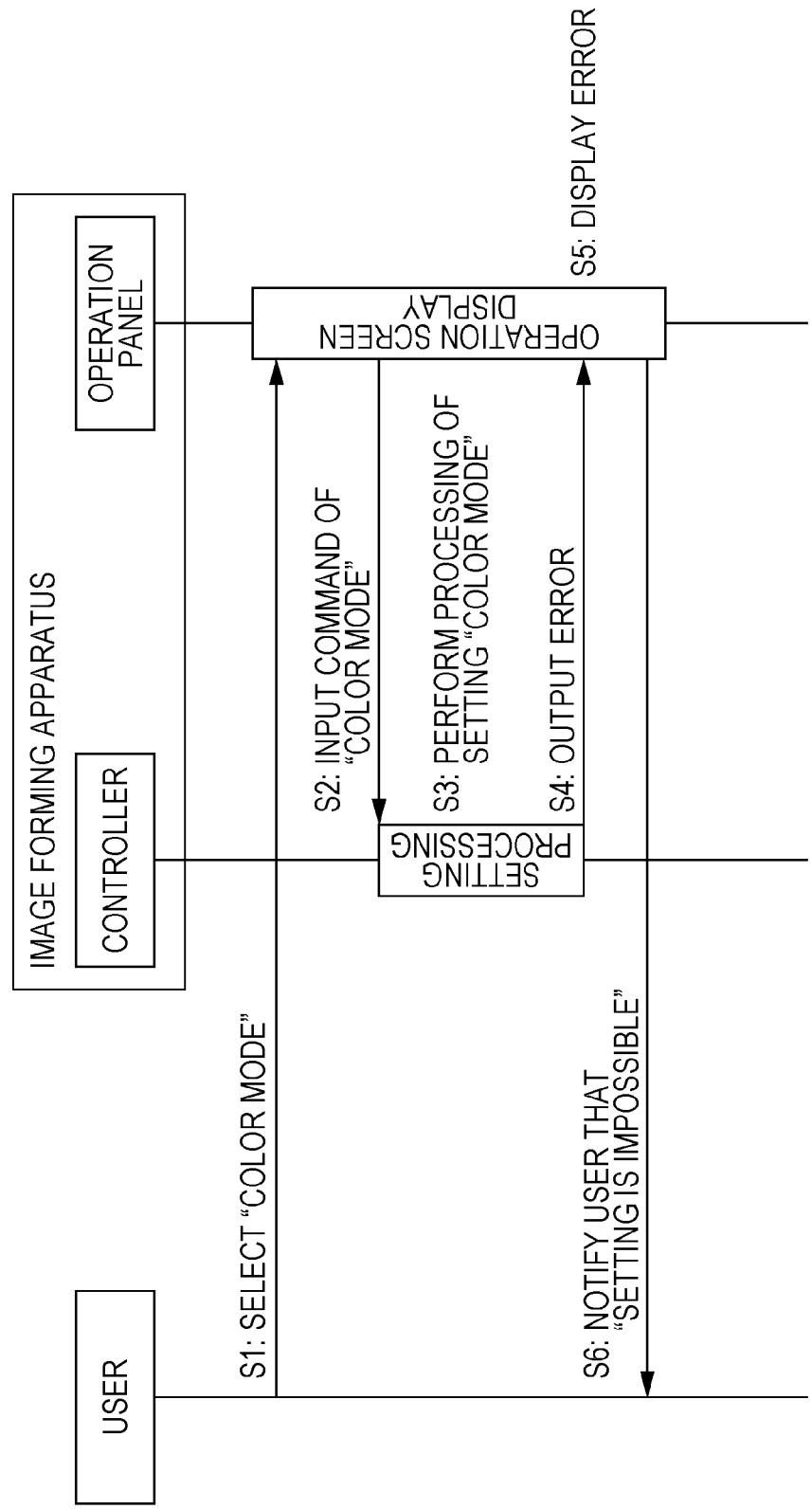
FIG. 2 is a sequence diagram for describing a procedure in a case of giving an instruction directly from an operation panel in the image forming system illustrated in FIG. 1.

Here, first, with reference to FIG. 2, a procedure for a response in a case where the user gives an instruction directly from the operation panel 16 will be described. FIG. 2 is a sequence diagram for describing the procedure in the case of giving an instruction directly from the operation panel 16 in the image forming system 1. After that, a procedure for responding to the voice instruction (response notification method and response notification instructions) in the image forming apparatus 10 having the above-described configuration will be described with reference to FIGS. 3 to 5.

(Step S1)
The user selects a "color mode" as a setting for image formation by directly performing an input operation from the operation screen on the operation panel 16.

(Step S2)
Since, on the operation panel 16, the "color mode" is selected in step S1, a command of the "color mode" is input to the controller 15.

(Step S3)
The controller 15 performs processing of setting the "color mode" in the image forming apparatus 10.

(Step S4)
If the image forming apparatus 10 cannot set the "color mode", the controller 15 outputs an error to the operation panel 16. For example, if the image forming apparatus 10 is a device that does not correspond to the "color mode" but corresponds to a "monochrome mode", the controller 15 determines that the image forming apparatus 10 cannot set the "color mode", and output an error to the operation panel 16.

(Step S5)
The operation panel 16 displays the error input from the controller 15 on the operation screen. For example, the message "setting is impossible" is displayed on the operation screen.

(Step S6)
The operation panel 16 displays "setting is impossible" on the operation screen to notify the user of this message.

As described above, when the user directly inputs the setting for image formation from the operation screen of the operation panel 16, the processing is performed by the image forming apparatus 10, and thus the operation is not interrupted even if the setting processing takes time.

Figure 3:
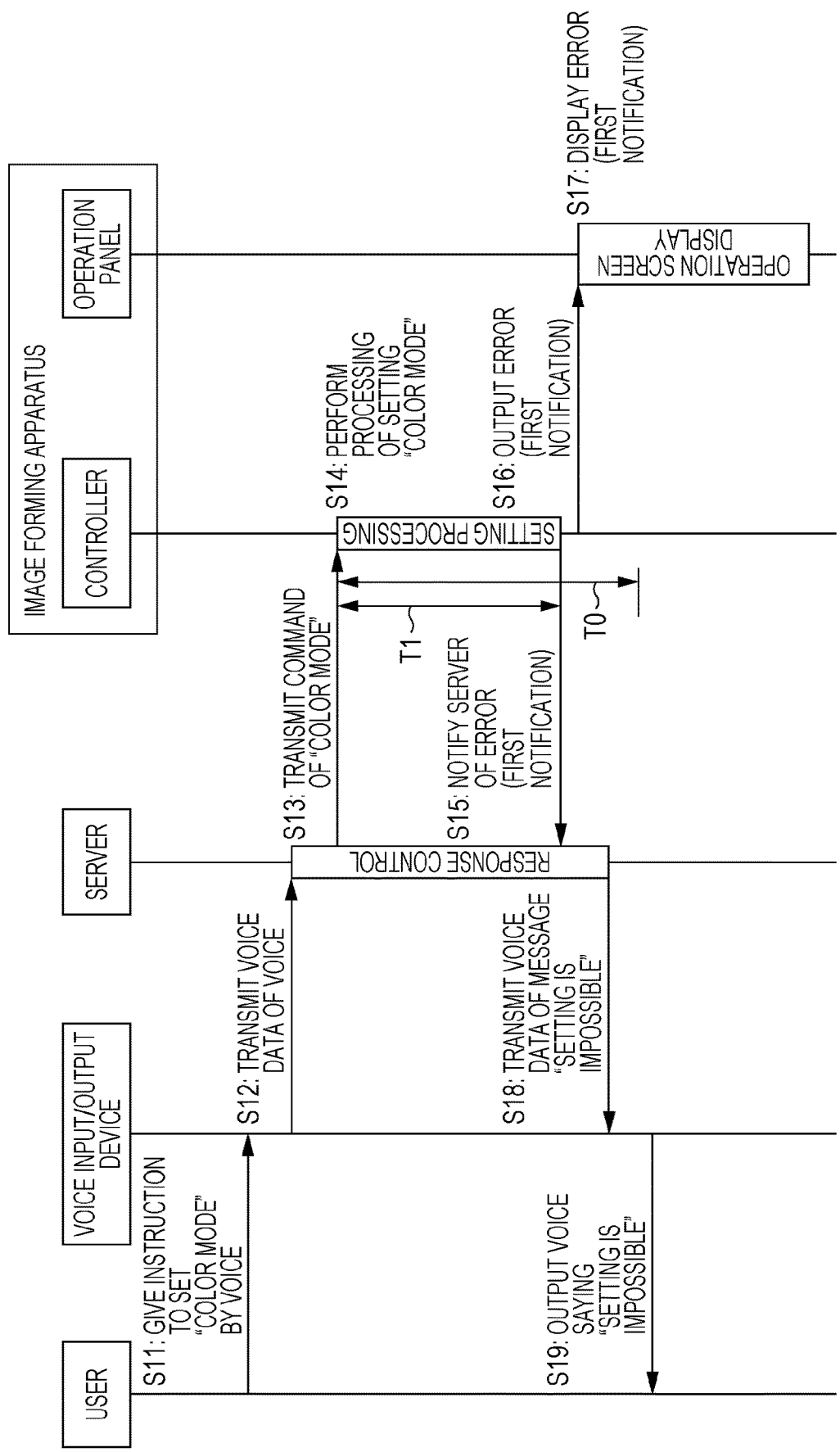
FIG. 3 is a sequence diagram for describing a procedure in a case where there is no delay in a response to a voice instruction but there is an error in the image forming system illustrated in FIG. 1.

Next, a procedure for responding to the voice instruction in a case where there is no delay in the response but there is an error will be described with reference to FIG. 3. FIG. 3 is a sequence diagram for describing the procedure in the case where there is no delay in the response to the voice instruction but there is an error in the image forming system 1.

(Step S11)
The user gives the voice instruction to the voice input/output device 30 by saying "color mode". As described above, the voice instruction made by voice is, for example, a setting instruction for a condition for performing the image formation.

(Step S12)
The voice input/output device 30 encodes the input voice into the voice data and transmits the voice data to the server 40.

(Step S13)
The server 40 (controller 42) performs the voice recognition processing on the voice data transmitted from the voice input/output device 30, and transmits the command of the "color mode" to the controller 15 of the image forming apparatus 10 since the instruction to set the "color mode" is made by voice in step S11. In this step and subsequent steps, the server 40 controls the response between the image forming apparatus 10 and the voice input/output device 30.

(Step S14)
The controller 15 performs the processing of setting the "color mode" in the image forming apparatus 10. At this time, the controller 15 starts measuring a processing time by a timer T1 as described with reference to FIG. 6 (see step S64) to be described later. Furthermore, before starting this measurement, the controller 15 sets a response waiting time T0 according to the timeout time of the server 40 as described with reference to FIG. 6 (see step S62). The response waiting time T0 is appropriately changed according to the timeout time of the server 40, and a time shorter than the timeout time is set.

(Step S15)
If the processing is completed and the image forming apparatus 10 cannot set the "color mode", the controller 15 notifies the server 40 of an error (first notification). The processing time measured by the timer T1 does not exceed the response waiting time T0 at this time. That is, the controller 15 notifies the server 40 of the error before the response waiting time T0. Therefore, in this case, the server 40 does not time out. Furthermore, here, the server 40 is notified of the error before step S16 to be described below, that is, immediately after completing the processing, and a time from the start of the processing to the error notification to the server 40 is shortened to prevent the timeout.

(Step S16)

If the image forming apparatus 10 cannot set the "color mode", the controller 15 outputs the error to the operation panel 16.

(Step S17)

The operation panel 16 displays the error input from the controller 15 on the operation screen. For example, the message "setting is impossible" is displayed on the operation screen.

(Step S18)

Upon receiving the error notification from the controller 15, the server 40 transmits voice data of the message "setting is impossible" to the voice input/output device 30.

(Step S19)

The voice input/output device 30 converts the voice data of the message "setting is impossible" transmitted from the server 40 into an electric signal, outputs the electric signal to the speaker of the voice input/output device 30, and causes the speaker to output a voice saying "setting is impossible".

Figure 4:
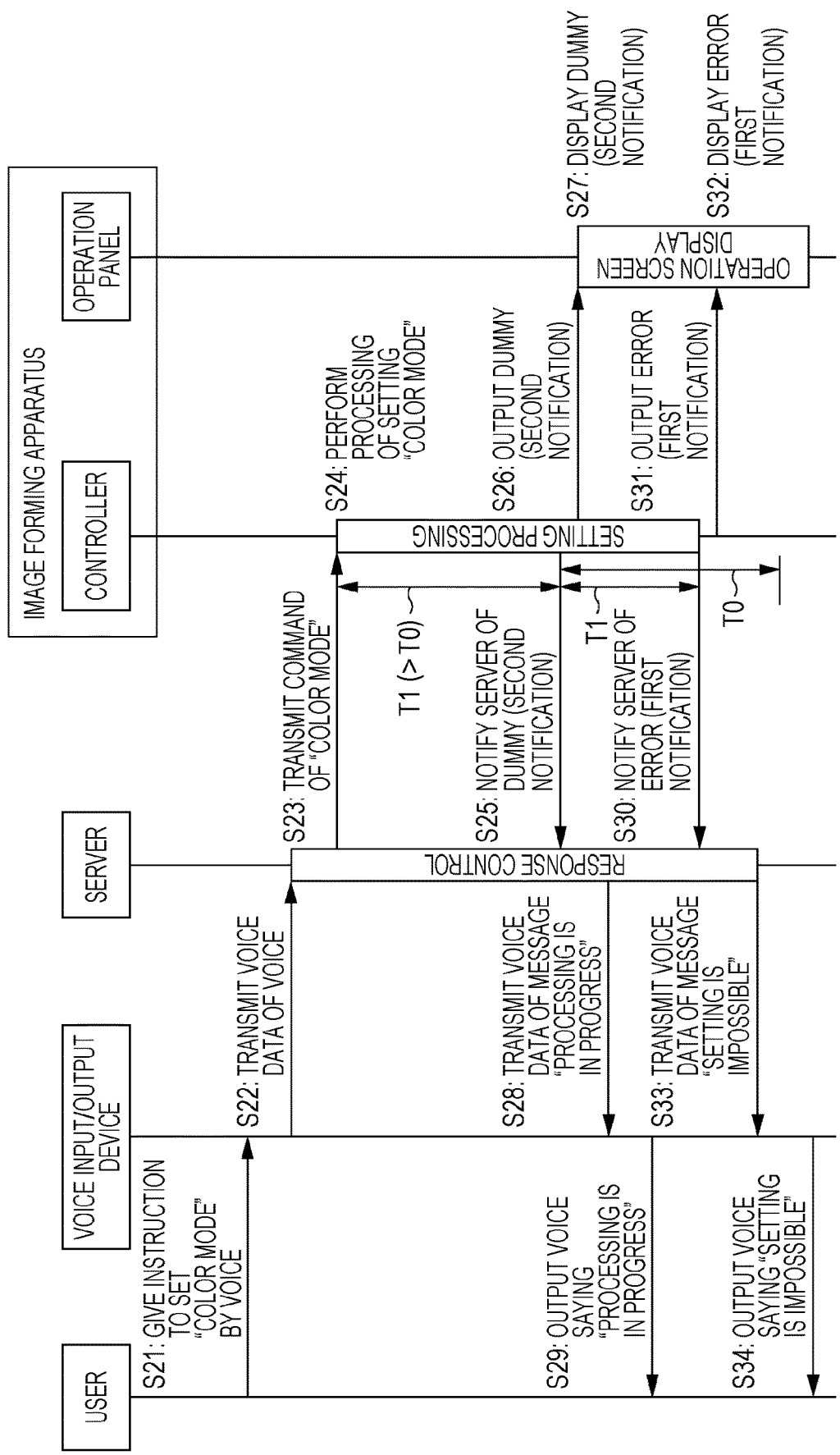
FIG. 4 is a sequence diagram for describing a procedure in a case where there is a delay in the response to the voice instruction and there is an error in the image forming system illustrated in FIG. 1.
Figure 5:
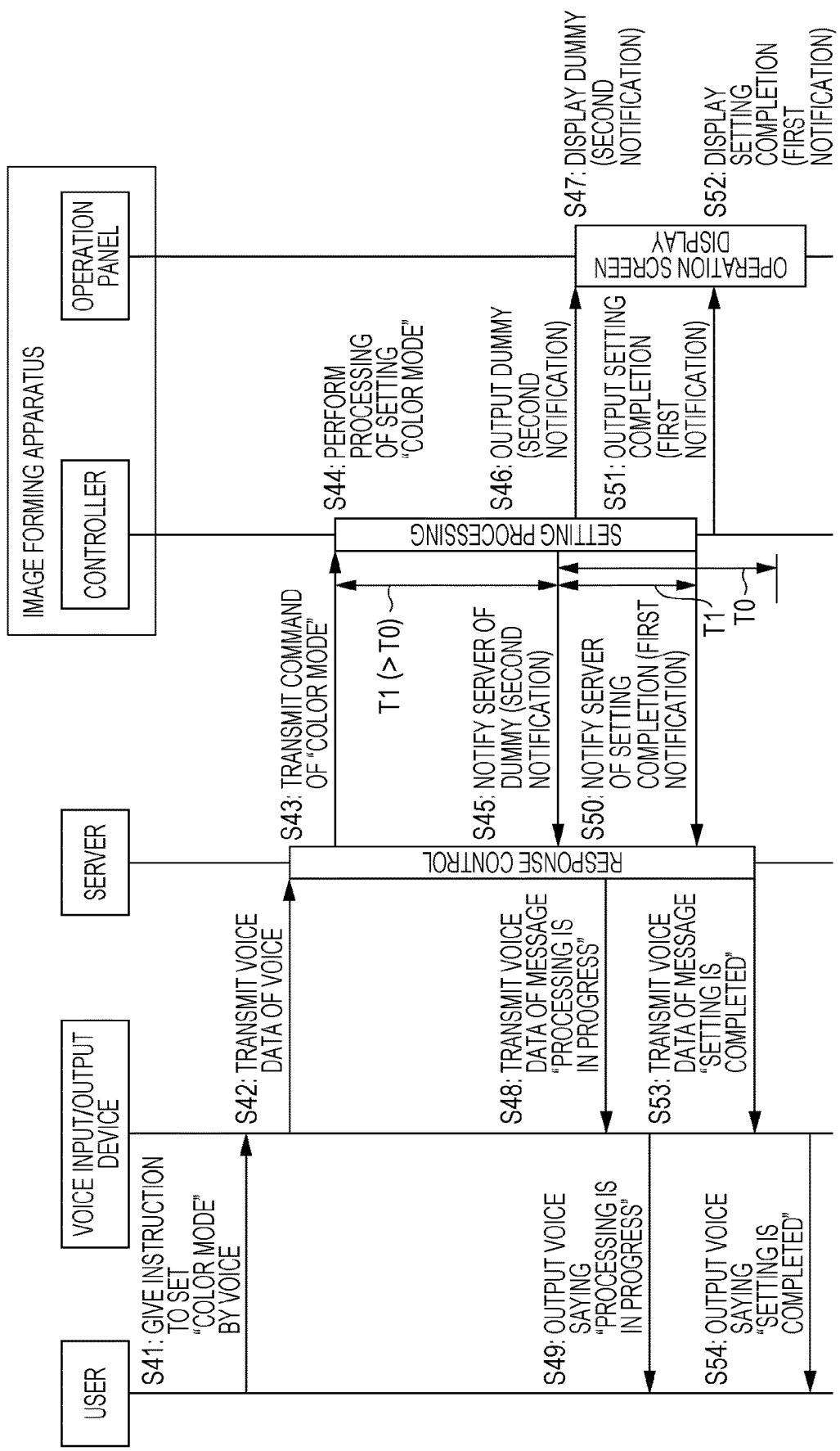
FIG. 5 is a sequence diagram for describing a procedure in a case where there is a delay in the response to the voice instruction and there is no error in the image forming system illustrated in FIG. 1.

As illustrated in FIG. 3, if the timeout time of the server 40 is longer than the processing time of the image forming apparatus 10, the timeout problem does not occur. However, the timeout time may vary depending on the server 40, and thus if the processing in the image forming apparatus 10 is not completed within the timeout time, a dummy response is made to extend the timeout as illustrated in FIGS. 4 and 5 to be described later.

Next, a procedure for responding to the voice instruction in a case where there is a delay in the response and there is an error will be described with reference to FIG. 4. FIG. 4 is a sequence diagram for describing the procedure in the case where there is a delay in the response to the voice instruction and there is an error in the image forming system 1.

(Steps S21 to S24)

Since steps S21 to S24 are the same as steps S11 to S14 illustrated in FIG. 3, redundant description will be omitted here.

(Step S25)

If it takes time for the image forming apparatus 10 to perform the processing of setting the "color mode", the controller 15 notifies the server 40 of a dummy (second notification). For example, the server 40 is notified that "processing is in progress", which is the dummy. Furthermore, the controller 15 may estimate the processing time, or may estimate that the processing takes time if the processing time being measured by the timer T1 exceeds the response waiting time T0 as described with reference to FIG. 6 (see step S67). That is, the controller 15 notifies the server 40 of the dummy before the timeout time of the server 40 to avoid the timeout of the server 40 and extend the timeout.

Figure 6:
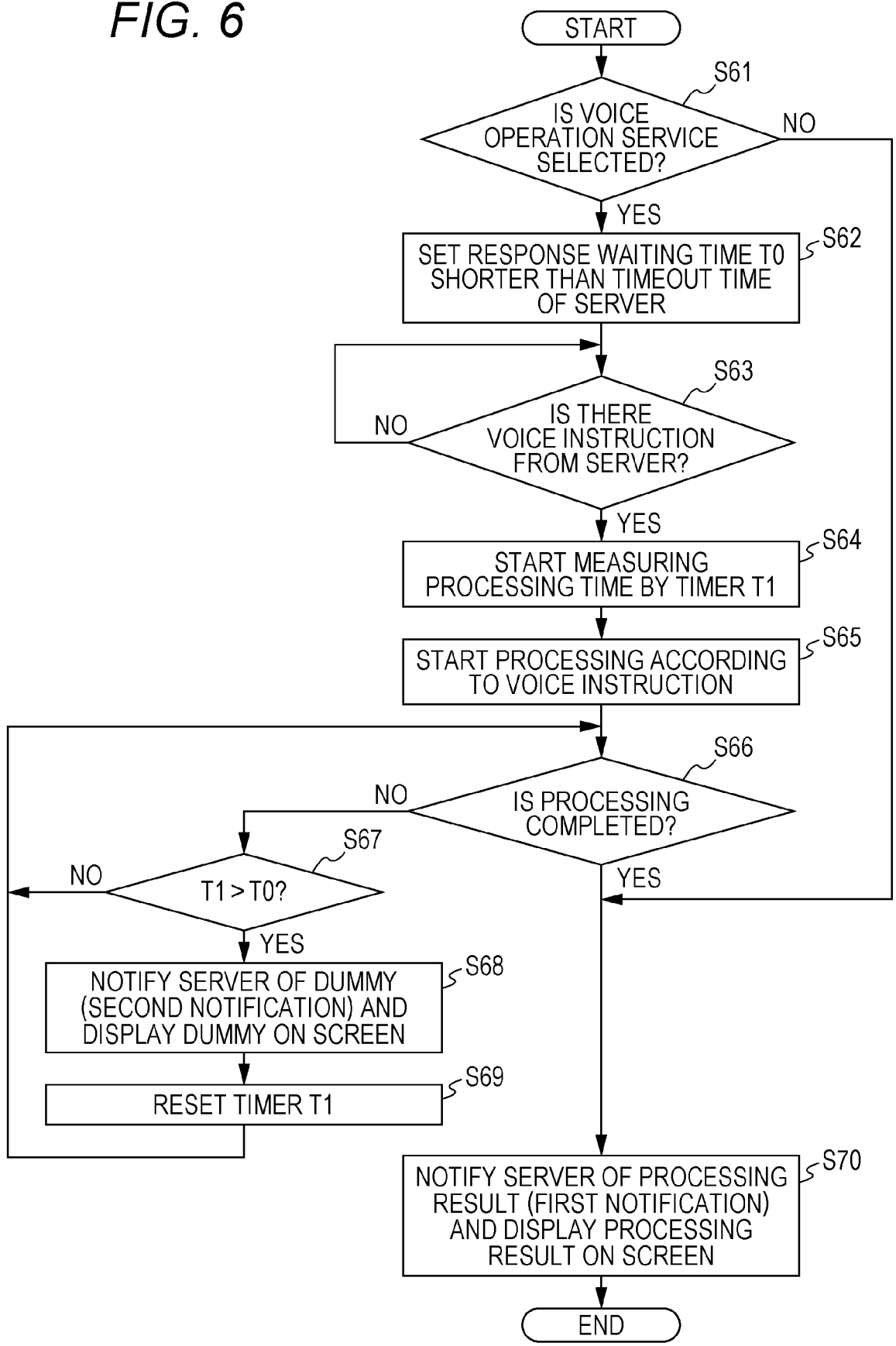
FIG. 6 is a flowchart for describing a control procedure in an image forming apparatus.

At this time, the controller 15 resets the timer T1 for the processing time to set the processing time measured by the timer T1 to zero as described with reference to FIG. 6 (see step S69). The timer T1 then starts remeasurement.

Note that processing according to the setting instruction in the controller 15 includes processing of displaying contents of the setting instruction on the operation panel 16 of the image forming apparatus 10, prohibition processing of determining whether the contents of the setting instruction include prohibited contents, and the like. For example, when the image data is transmitted, the prohibition processing is required to specify a destination, and when such processing is performed, the setting processing may take time.

Furthermore, as the dummy, a fixed phrase such as "work is in progress" or "please wait for a while" may be used instead of "processing is in progress", or remaining time of the processing may be used.

(Step S26)

If it takes time for the image forming apparatus 10 to perform the processing of setting the "color mode", the controller 15 outputs the dummy to the operation panel 16. For example, the message "processing is in progress" is output as the dummy.

(Step S27)

The operation panel 16 displays the dummy input from the controller 15 on the operation screen. For example, the message "processing is in progress" is displayed on the operation screen.

(Step S28)

Upon receiving the dummy notification from the controller 15, the server 40 transmits voice data of the message "processing is in progress" to the voice input/output device 30.

(Step S29)

The voice input/output device 30 converts the voice data of the message "processing is in progress" transmitted from the server 40 into an electric signal, outputs the electric signal to the speaker of the voice input/output device 30, and causes the speaker to output a voice saying "processing is in progress".

(Step S30)

If the image forming apparatus 10 cannot set the "color mode", the controller 15 notifies the server 40 of an error (first notification). In step S25, the timer T1 is reset so that the processing time measured by the timer T1 is set to zero, and the timer T1 remeasures the processing time. The processing time remeasured by the timer T1 does not exceed the response waiting time T0 at this time. That is, the controller 15 notifies the server 40 of the error before the response waiting time T0 after the remeasurement. Therefore, in this case, the server 40 does not time out. Furthermore, here as well, the server 40 is notified of the error before step S31 to be described below, that is, immediately after completing the processing, and the time from the start of the remeasurement to the error notification to the server 40 is shortened to prevent the timeout.

(Steps S31 to S34)

Since steps S31 to S34 are the same as steps S16 to S19 illustrated in FIG. 3, redundant description will be omitted here.

Next, a procedure for responding to the voice instruction in a case where there is a delay in the response and there is no error will be described with reference to FIG. 5. FIG. 5 is a sequence diagram for describing the procedure in the case where there is a delay in the response to the voice instruction and there is no error in the image forming system 1.

(Steps S41 to S49)

Since steps S41 to S49 are the same as steps S21 to S29 illustrated in FIG. 4, redundant description will be omitted here.

(Step S50)

After setting the "color mode" in the image forming apparatus 10, the controller 15 notifies the server 40 of the setting completion (first notification). In step S45, the timer T1 is reset so that the processing time measured by the timer T1 is set to zero, and the timer T1 remeasures the processing time. The processing time remeasured by the timer T1 does not exceed the response waiting time T0 at this time. That is, the controller 15 notifies the server 40 of the setting completion before the response waiting time T0 after the remeasurement. Therefore, in this case, the server 40 does not time out. Furthermore, here as well, the server 40 is notified of the setting completion before step S51 to be described below, that is, immediately after completing the processing, and the time from the start of the remeasurement to the notification of the setting completion to the server 40 is shortened to prevent the timeout.

(Step S51)

After setting the "color mode" in the image forming apparatus 10, the controller 15 outputs the setting completion to the operation panel 16.

(Step S52)

The operation panel 16 displays the setting completion input from the controller 15 on the operation screen. For example, the message "setting is completed" is displayed on the operation screen.

(Step S53)

Upon receiving the notification of the setting completion from the controller 15, the server 40 transmits voice data of the message "setting is completed" to the voice input/output device 30.

(Step S54)

The voice input/output device 30 converts the voice data of the message "setting is completed" transmitted from the server 40 into an electric signal, outputs the electric signal to the speaker of the voice input/output device 30, and causes the speaker to output a voice saying "setting is completed".

As described above, if the processing in the image forming apparatus 10 is not completed within the timeout time of the server 40, the dummy response is made to extend the timeout. As a result, it is possible to prevent interruption and re-operation of the voice operation, and it is possible to prevent operability of the voice operation from deteriorating.

Next, a control procedure in the controller 15 of the image forming apparatus 10 in the above-described sequence of FIGS. 3 to 5 will be described with reference to FIG. 6. FIG. 6 is a flowchart for describing the control procedure in the image forming apparatus 10.

(Step S61)

The controller 15 determines whether a voice operation service is selected. If the voice operation service is selected (YES), the flow proceeds to step S62, and if the voice operation service is not selected (NO), the flow proceeds to step S70. If the voice operation service is not selected, for example, the sequence illustrated in FIG. 2 described above is implemented. Furthermore, the selection of the voice operation service is preset by the user using, for example, the operation panel 16.

(Step S62)

The controller 15 sets the response waiting time T0 according to the timeout time of the server 40. The response waiting time T0 is set shorter than the timeout time by a predetermined time. For example, when the timeout time is seven seconds, the response waiting time T0 is six seconds.

(Step S63)

The controller 15 confirms whether there is the voice instruction from the server 40. If there is the voice instruction (YES), the flow proceeds to step S64, and if there is no voice instruction (NO), step S63 is repeated.

(Step S64)

If there is the voice instruction from the server 40, the controller 15 starts measuring the processing time by the timer T1. The timer T1 measures the time taken for the processing executed by the image forming apparatus 10 in response to the voice instruction, for example, the setting processing described above.

(Step S65)

The controller 15 starts executing the processing executed by the image forming apparatus 10 in response to the voice instruction, for example, the setting processing described above.

(Step S66)

The controller 15 determines whether the processing executed by the image forming apparatus 10 is completed. If the processing is completed (YES), the flow proceeds to step S70, and if the processing is not completed (NO), the flow proceeds to step S67. That is, the controller 15 repeats steps S67 to S69 to be described later until the processing is completed. Note that, in order to prevent the processing from being prolonged, an upper limit of the number of times of extending the timeout may be set, and steps S67 to S69 to be described later may be repeated up to the upper limit.

(Step S67)

The controller 15 compares the processing time measured by the timer T1 with the response waiting time T0, the flow proceeds to step S68 if the processing time measured by the timer T1 exceeds the response waiting time T0 (YES), and the flow returns to step S66 if the processing time measured by the timer T1 does not exceed the response waiting time T0 (NO).

(Step S68)

In the case of T1>T0, that is, in a case where the processing time measured by the timer T1 exceeds the response waiting time T0, the controller 15 notifies the server 40 of the dummy and displays the dummy on the screen of the operation panel 16. For example, the server 40 is notified that "processing is in progress", which is the dummy, and the message "processing is in progress" is displayed on the screen of the operation panel 16. As a result, the server 40 does not time out.

(Step S69)

The controller 15 resets the timer T1 for the processing time to set the processing measured by the timer T1 to zero. The timer T1 then starts the remeasurement, and the flow returns to step S66.

In the case of repeating steps S67 to S69, the controller 15 notifies, in the case of T1>T0 in step S67, the server 40 of the dummy again and displays the dummy on the operation panel 16 again.

(Step S70)

When the processing is completed, the controller 15 notifies the server 40 of a processing result and displays the processing result on the screen of the operation panel 16. For example, in the case of FIG. 5, the server 40 is notified that "setting is completed", and the message "setting is completed" is displayed on the screen of the operation panel 16.

As described above, in the image forming apparatus 10, the controller 15 measures, by the timer T1, the processing time of the processing according to the voice instruction, and notifies the server 40 of the dummy if the processing time measured by the timer T1 exceeds the preset response waiting time T0. Since the response waiting time T0 is set shorter than the timeout time of the server 40, notifying the server 40 of the dummy in the case of T1>T0 makes it possible to reliably avoid the timeout of the server 40.

As described in detail above, in the image forming system 1 of one or more embodiments, the image forming apparatus 10 includes a processing executor that executes processing according to an instruction (voice instruction) input via an external device, and a first notifier that sends, to the external device, a first notification according to a completion of the execution of the processing. Furthermore, the image forming apparatus 10 includes a second notifier that sends, to the external device, a second notification different from the first notification when it is estimated that the execution of the processing is not completed before a timeout time set in the external device for the first notification.

According to one or more embodiments configured as described above, it is possible to avoid the timeout of the server 40 when the voice operation is performed from the voice input/output device 30 and the server 40, which are the external devices.

Therefore, since the voice operation is not interrupted by the timeout of the server 40, a subsequent voice operation can be continued and the operation does not have to be restarted from the beginning. Thus, it is possible to prevent the voice operation from being interrupted and the operability of the voice operation from deteriorating.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming apparatus comprising:
a hardware processor that:
executes processing corresponding to an instruction input via an external device;
sends a first notification to the external device according to a completion of execution of the processing;
sets a waiting time shorter than a timeout time of the external device by a predetermined amount of time;
compares a processing time for executing the processing in response to the instruction with the waiting time; and
upon determining that the processing time exceeds the waiting time, sends a second notification different from the first notification to the external device.

2. The image forming apparatus according to claim 1, wherein
the instruction is a setting instruction for setting a condition for performing image formation.

3. The image forming apparatus according to claim 2, further comprising:
a display, wherein
the processing corresponding to the setting instruction includes displaying a content of the setting instruction on the display.

4. The image forming apparatus according to claim 2, wherein
the processing corresponding to the setting instruction includes determining whether a content of the setting instruction includes a prohibited content.

5. The image forming apparatus according to claim 1, wherein
the hardware processor notifies, as the second notification, the external device that the processing is in progress.

6. The image forming apparatus according to claim 1, wherein
the hardware processor:
resets the processing time to zero after sending the second notification to the external device,
measures the processing time from the reset, and
sends the second notification to the external device when the measured processing time exceeds the waiting time.

7. The image forming apparatus according to claim 1, wherein
the hardware processor sends the first notification to the external device after the completion of execution of the processing.

8. The image forming apparatus according to claim 1, wherein
the external device includes a smart speaker that receives a voice instruction from a user.

9. The image forming apparatus according to claim 1, wherein
the external device includes
a smart speaker that receives a voice instruction from a user, and
a server that:
outputs, to the image forming apparatus, the voice instruction input to the smart speaker, and
transmits, to the smart speaker, the first notification and the second notification sent from the image forming apparatus.

10. A response notification method comprising:
sending a first notification to an external device according to a completion of execution of processing corresponding to an instruction input via the external device;
setting a waiting time shorter than a timeout time of the external device by a predetermined amount of time;
compares a processing time for executing the processing in response to the instruction with the waiting time; and
upon determining that the processing time exceeds the waiting time, sending a second notification different from the first notification to the external device.

11. A non-transitory recording medium storing response notification instructions that cause a computer to execute:
sending a first notification to an external device according to a completion of execution of processing corresponding to an instruction input via the external device;
setting a waiting time shorter than a timeout time of the external device by a predetermined amount of time;
compares a processing time for executing the processing in response to the instruction with the waiting time; and
upon determining that the processing time exceeds the waiting time, sending a second notification different from the first notification to the external device.

* * * * *